July 5, 1938.  D. E. FOSTER  2,122,567
TUNING INDICATOR CIRCUIT
Filed April 30, 1936
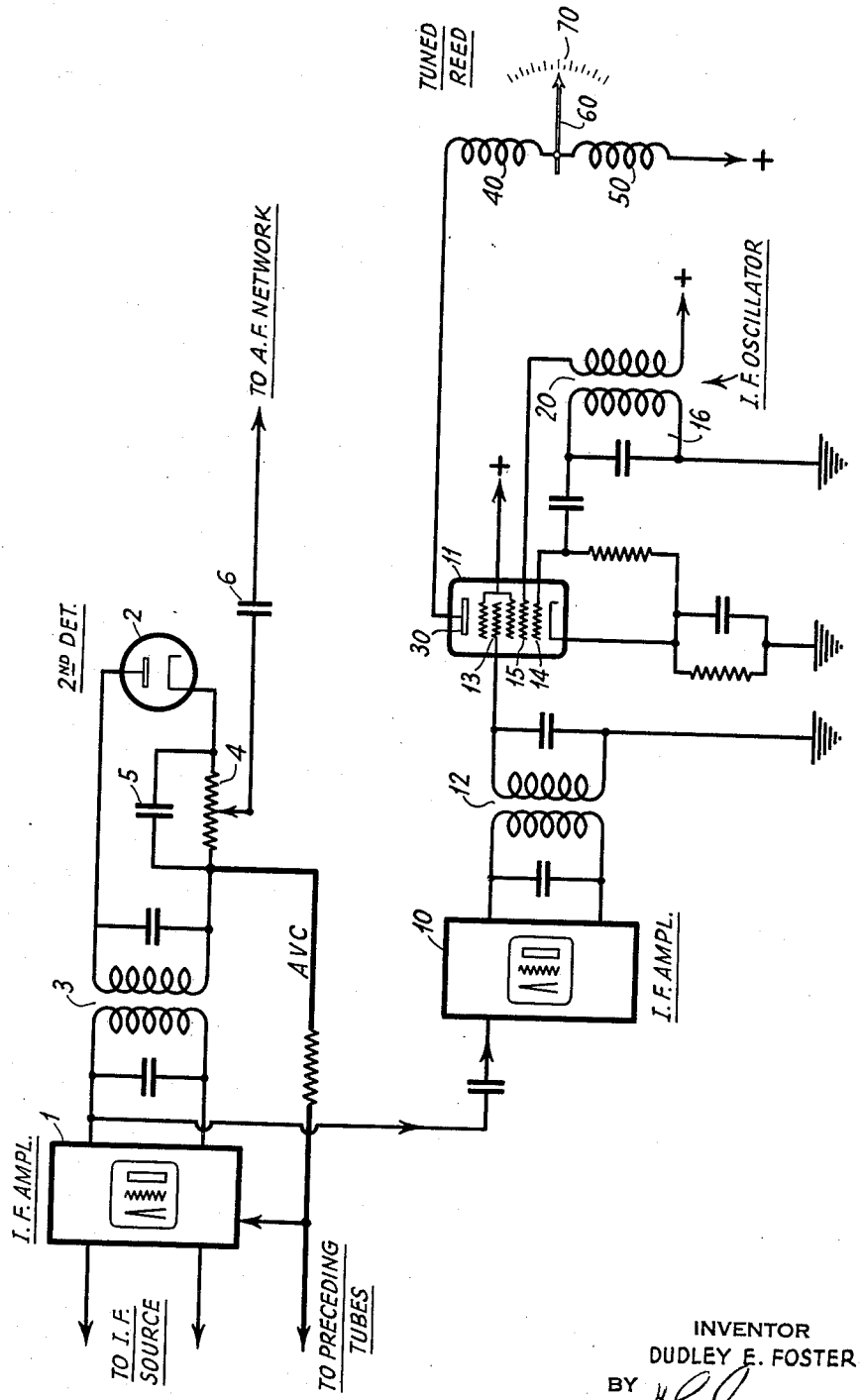
INVENTOR
DUDLEY E. FOSTER
BY
ATTORNEY Patented July 5, 1938

2,122,567

UNITED STATES PATENT OFFICE 2,122,567

TUNING INDICATOR CIRCUIT

Dudley E. Foster, Orange, N. J., assignor to Radio Corporation of America, a corporation of Delaware Application April 30, 1936, Serial No. 77,088

5 Claims. (Cl. 250—20)

My present invention relates to tuning indicator circuits for radio receivers, and more particularly to superheterodyne receivers of the type employing a visual tuning indicator arrangement.

In the past there have been employed various tuning indicating arrangements in superheterodyne receivers, and the function of such arrangements has been to indicate, usually in an audible manner, when the receiver was accurately tuned to a desired signal carrier frequency. For example, in such arrangements of the prior art locally produced oscillations having the frequency of the i. f. have been fed to the second detector network to produce an audible beat in the audio reproducer when the i. f. value shifted from its assigned operating frequency. It has been found that, in general, an exact means of locating precise resonance in a superheterodyne receiver is to utilize the beat between the incoming signal and the local oscillator operating at i. f. However, to permit such beat note in the audio channel is not only conducive to annoyance for the operator during tuning, but requires a stopping of the indication beat in order to receive signals when the receiver is tuned. In other words, any arrangement which utilizes an audible beat indication for accurate tuning of the superheterodyne receiver, necessitates a device for stopping the audio beat note when it is desired to receive the useful signals.

It may be stated, therefore, that it is one of the main objects of my present invention to provide a means for accurately locating the exact resonance point when tuning a superheterodyne receiver, and to do so by means of a resonance indication device which may be permitted to operate continuously without any interference with the receiver operator.

Another important object of the invention may be stated to reside in the provision of a visual resonance indicator device arrangement for a superheterodyne receiver, and wherein the visual indicator is coupled to the i. f. channel of the receiver through a signal transmission channel which is independent of the audio channel.

Another object of the invention is to provide a visual tuning indicator for a superheterodyne receiver, and wherein the indicator is of the resonant reed type, the reed being adapted to vibrate solely when the i. f. energy impressed on the indicator circuit differs from the frequency of the source of local oscillations by the resonant period of the reed.

Still other objects of the invention are to improve generally the efficiency and reliability of resonance indicating arrangements for superheterodyne receivers, and more especially to provide visual tuning indicators for such receivers which are not only reliable and durable in operation but economically manufactured and assembled in the receiver.

The novel features which I believe to be characteristic of my invention are set forth in particularity in the appended claims; the invention itself, however, as to both its organization and method of operation will best be understood by reference to the following description taken in connection with the drawing in which I have indicated diagrammatically a circuit organization whereby my invention may be carried into effect.

Referring now to the accompanying drawing, there is shown in purely schematic manner a superheterodyne receiver which embodies the visual tuning indicator arrangement connected in operative relation to the i. f. channel of the receiver at all times. Those skilled in the art are fully acquainted with the circuit details of the conventional types of superheterodyne receiver, and for this reason it may be stated that the numeral 1 denotes one or more stages of i. f. amplification, each stage including an amplifier tube having associated therewith resonant input and output circuits fixedly tuned to the operating i. f. The input to the i. f. amplifier 1 is coupled to the usual signal collector; tunable radio frequency amplifiers; tunable first detector; and the first detector is fed with locally produced oscillations from the tunable local oscillator of the receiving system. The tuning devices of the various networks preceding the amplifier 1 are arranged for uni-control adjustment and the output circuit of the first detector network is supplied with i. f. energy. The frequency of the latter may range anywhere from 75 to 450 kc., and the particular value will depend solely upon the requirements and frequency operating bands of the receiver. It is also pointed out that the receiver may be of the multi-range type, and can not only be operated in the broadcast channel, but may be used in any of the short-wave ranges.

The i. f. amplifier 1 is coupled to a second detector or audio demodulator 2 through the i. f. transformer 3, and the primary and secondary circuits of the latter are each fixedly tuned to the operating i. f. The demodulator 2 is shown as of the diode type but it is to be understood that any other type of demodulator may be used. The diode load resistor 4, suitably by-passed for i. f. currents by the condenser 5, is arranged in the low alternating potential side of the input circuit of the demodulator 2.

The audio component of rectified current flowing through resistor 4 is fed to any desired type of audio utilization network through the coupling means 6; and it will be understood that the audio network may comprise one or more stages of audio amplification followed by any desired type of audio reproducer. The direct current component of rectified current flowing through resistor 3 may be used, if desired, for automatic gain control of the various signal transmission tubes preceding the demodulator. This gain control arrangement is denoted by the symbol "AVC", and those skilled in the art are so thoroughly conversant with the nature of such AVC arrangement that it is not believed necessary to describe the manner of construction or functioning of this arrangement. It is only necessary to point out that the AVC arrangement acts to vary the gain of the controlled signal transmission tubes in such a manner that the gain of such controlled tubes is reduced as the signal amplitude increases above a predetermined level, and in this way the signal carrier amplitude at the input circuit of the demodulator tube is maintained substantially uniform in spite of variations in signal carrier amplitude at the receiver signal collector.

When an AVC arrangement is used in a superheterodyne receiver it becomes difficult to accurately tune the receiver. This is due to the fact that the audio output of the receiver appears to decrease in volume as the receiver is tuned from a point off resonance with a desired signal, to exact resonance. Furthermore, high selectivity of the superheterodyne receiver also makes it difficult to accurately tune the receiver. For this reason the visual tuning indicator arrangement is provided. This arrangement generally comprises the i. f. amplifier 10 whose input is coupled to the high alternating potential side of the resonant primary circuit of the i. f. transformer 3. The amplified i. f. signals are impressed on the signal input grid of the tube 11 through i. f. transformer 12, and the primary and secondary circuits of the latter are each fixedly tuned to the operating i. f.

The tube 11 may be of the 2A7 type, and, as pointed out heretofore, the i. f. energy is impressed between the signal input grid 13 and the cathode. The grids 14 and 15 of the tube 11 function, respectively, as the oscillator grid and oscillator anode of a local oscillator which produces oscillations of the i. f. value. This is accomplished by connecting the oscillator tank circuit 16 between the oscillator grid 14 and the grounded side of the cathode circuit. It will be understood that the tank circuit 16 is tuned to the operating i. f. value. The oscillator anode electrode 15 is reactively coupled, as by means of transformer 20, to the tank circuit 16. The remaining circuit details of the local oscillator circuit are too well understood to require any further explanation, it is only necessary to point out that the currents flowing in the circuit connected to the output anode, or plate, 30 of tube 11, are of a frequency representing the sum and difference frequencies of the i. f. signal frequency and the i. f. oscillations. The signal grid 13 is surrounded by a positive electrostatic screening electrode, and the tube 11 functions as an electron coupled mixer tube. Those skilled in the art are fully aware of this type of so-called "pentagrid converter" circuit.

The various electrodes of tube 11 which are required to have a positive potential applied to them may be supplied with such potential from a common voltage source. The plate circuit of tube 11 includes the reed magnetic deflection coils 40 and 50, and the reed 60 is positioned with respect to coils 40 and 50 so as to vibrate when the currents flowing through coils 40 and 50 have a frequency equal to the resonant period of the reed 60. Any desired type of scale 70 may be disposed adjacent the free end of the reed 60. It is not believed necessary to go into an explanation of the constructional details of the tuned reed, since those skilled in the art are fully aware of such construction. However, it is pointed out that the reed has a natural period of the order of 20 cycles, and it will therefore vibrate at either side of the desired carrier, when the receiver is tuned to 20 cycles off the carrier.

In considering the operation of the receiver it will be seen that the reed 60 will be immobile as long as the currents flowing through the coils 40 and 50 are of a frequency different from the period of the reed 60. Since the reed 60 will vibrate on 20 cycles on either side of the desired frequency carrier signal, it follows that if the receiver is tuned in a direction which is a considerable frequency value from the desired carrier, and no vibration of reed 60 occurs, that will indicate to the set operator that the receiver must be adjusted in the opposite direction because if the receiver were adjusted to a point very close to the carrier, and less than 20 cycles from it, then further adjustment of the receiver tuning device would cause vibration of reed 60. In tuning the receiver the operator will adjust the usual tuning condenser to the desired frequency setting, or as close to it as he can. If no vibration of reed 60 occurs, then the tuning device is carefully adjusted until reed 60 vibrates. The operator will know immediately that between the limiting vibration points of the reed 60 is located the desired carrier. This results in an accurate resonance adjustment of the receiver.

It will now be observed that the visual tuning indication arrangement is independent of the audio channel of the receiver and gives a visual indication, rather than an audible one. Because of this fact there is no audible interference and annoyance to the said operator. As a consequence the tuning indication arrangement may be permitted to be in continuous operative relation to the i. f. channel, and there is no need for any switching mechanism for disconnecting the tuning indicator circuit.

While I have indicated and described one system for carrying my invention into effect, it will be apparent to one skilled in the art that my invention is by no means limited to the particular organization shown and described, but that many modifications may be made without departing from the scope of my invention, as set forth in the appended claims.

What I claim is:

1. In combination, in a superheterodyne receiver of the type including an intermediate frequency network followed by an audio demodulator, a mixer network having a signal input circuit connected to the intermediate frequency network, means for producing local oscillations of the operating intermediate frequency value, and a visual indicator device in the mixer output circuit having a natural period equal to a predetermined frequency difference between the said local oscillation frequency and the frequency of said intermediate frequency energy.

2. In combination, in a superheterodyne receiver of the type including an intermediate frequency network followed by an audio demodulator, a mixer network having a signal input circuit connected to the intermediate frequency network, means for producing local oscillations of the operating intermediate frequency value, a visual indicator device in the mixer output circuit having a natural period equal to a predetermined frequency difference between the said local oscillation frequency and the frequency of said intermediate frequency energy, and said last device comprising a vibratory element having a sharply resonant period.

3. In combination, in a superheterodyne receiver of the type including an intermediate frequency network followed by an audio demodulator, a mixer network having a signal input circuit connected to the intermediate frequency network, means for producing local oscillations of the operating intermediate frequency value, a visual indicator device in the mixer output circuit having a natural period equal to a predetermined frequency difference between the said local oscillation frequency and the frequency of said intermediate frequency energy, and said mixer network comprising a tube having a cathode, an output anode, and at least three electrodes disposed between the cathode and output anode, said intermediate frequency energy being impressed between the cathode and one of the intermediate electrodes, and means for reactively coupling one of the remaining intermediate electrodes to the third intermediate electrode whereby said local oscillations are produced.

4. In combination, in a superheterodyne receiver, an intermediate frequency transmission channel including an amplifier, a rectifier of the intermediate frequency energy, an automatic volume control arrangement for varying the intermediate frequency energy amplification in a sense to maintain the signal carrier amplitude at the rectifier uniform, means for beating the output energy of the intermediate frequency channel with oscillations of a frequency equal to the operating intermediate frequency, and a visual indicator device, responsive to the beats between the intermediate frequency energy and the local oscillations, having a natural period so chosen that a tuning indication is produced when the intermediate frequency energy departs in frequency from the operating intermediate frequency by a relatively small frequency amount.

5. In combination, in a superheterodyne receiver, an intermediate frequency transmission channel, a rectifier of the intermediate frequency energy, an automatic volume control arrangement for varying the intermediate frequency energy transmission in a sense to maintain the signal carrier amplitude at the rectifier uniform, means for beating the output energy of the intermediate frequency channel with oscillations of a frequency equal to the operating intermediate frequency, and a visual indicator device responsive to the beats between the intermediate frequency energy and the local oscillations, the visual indicator responding only when the intermediate frequency energy produced is within a few cycles of the operating intermediate frequency.

DUDLEY E. FOSTER.